United States Patent [19]
Yoshimura

[11] Patent Number: 4,671,536
[45] Date of Patent: Jun. 9, 1987

[54] STEERING COLUMN SUPPORT STRUCTURE FOR A VEHICLE STEERING MECHANISM

[75] Inventor: Toshiteru Yoshimura, Hiroshima, Japan

[73] Assignee: Mazda Motor Corporation, Hiroshima, Japan

[21] Appl. No.: 809,754

[22] Filed: Dec. 17, 1985

[30] Foreign Application Priority Data

Dec. 21, 1984 [JP] Japan .................. 59-270474

[51] Int. Cl.$^4$ .............................................. B62D 1/18
[52] U.S. Cl. ...................................... 280/779; 74/492
[58] Field of Search ................ 280/777, 779, 750; 74/492

[56] References Cited

U.S. PATENT DOCUMENTS 4,362,319 12/1982 Masaki et al. ............... 280/779
4,406,176 9/1983 Numazawa et al. ........... 280/779

FOREIGN PATENT DOCUMENTS 5739870 8/1980 Japan .
59-75360 5/1984 Japan .

Primary Examiner—Richard A. Bertsch
Attorney, Agent, or Firm—Fleit, Jacobson, Cohn & Price

[57] ABSTRACT

A vehicle steering column support structure including a first support member made of a steel pipe extending between the cowl side panels substantially parallelly with the cowl inner panel. A second support member of a substantially L-shaped configuration is provided and has a first portion extending along the first support member and a second portion extending downward from the first portion. The first portion is connected at the end with the cowl side panel and the second portion is connected to the floor panel. The steering column is supported through a bracket by the first and second support member and the cowl inner panel.

12 Claims, 8 Drawing Figures

STEERING COLUMN SUPPORT STRUCTURE FOR A VEHICLE STEERING MECHANISM

BACKGROUND OF THE INVENTION

1. Field of the Invention

The present invention relates to a vehicle steering mechanism and more particularly to a steering column support structure for a vehicle steering mechanism.

2. Description of Prior Art

In a vehicle having a body which includes cowl side panels extending forwardly from the door hinge pillars and a cowl inner panel extending transversely between the cowl side panels, it has been a common practice to install a bracket on the cowl inner panel for supporting a steering column assembly. The conventional structure is however disadvantageous in that the cowl inner panel cannot provide a satisfactorily rigid support for the steering column assembly so that vibrations are produced in the steering column assembly under a high speed operation or a rough road operation. In view of the problems, a proposal has been made by the Japanese utility model application No. 55-115948 filed on Aug. 18, 1980 and disclosed for public inspection on Mar. 3, 1982 under the disclosure number 57-39870 to provide a tubular member extending between and secured to the cowl side panels and to support the column support bracket by the cowl inner panel and the tubular member. The structure proposed by the Japanese utility model can therefore provide an increased rigidity in supporting the steering column assembly to a certain extent. It has however been found that the structure is insufficient to decrease or eliminate vibrations of the steering column assembly in vertical directions, Japanese utility model application No. 57-171275 filed on Nov. 12, 1982 and disclosed for public inspection on May 22, 1984 under the disclosure number 59-75360 discloses a steering column support structure having a transversely extending support pipe which is bifurcated at the portion where it supports the steering column. Even in this structure, a satisfactory rigidity cannot be obtained.

SUMMARY OF THE INVENTION

It is therefore an object of the present invention to provide a steering column supporting structure in which vertical vibrations can be suppressed.

Another object of the present invention is to provide a steering column support structure which can support the vehicle steering column assembly with a satisfactory rigidity in any direction.

According to the present invention, the above and other objects can be accomplished by a vehicle steering column support structure including cowl side panels extending at the opposite sides of a vehicle body forwardly from door hinge pillars, a cowl inner panel extending transversely and having opposite ends secured to the cowl side panels, respectively, a first elongated support member extending transversely along said cowl inner panel and having opposite ends secured to the cowl side panels, respectively, a second support member having a first portion connected at one end with one of the cowl side panels and extending along said cowl inner panel and a second portion extending downward from the other end of the first portion and having a lower end secured to a floor panel of the vehicle body, means for supporting a steering column assembly by said first support member and the first portion of the second support member. Preferably, the first and second support members are made of a steel pipe.

According to the features of the present invention, the first support member provides rigid supports in longitudinal and transverse directions. The second support member functions to distribute vibrations to the cowl side panels and the floor panel. Thus, it is possible to increase the rigidity in the vertical direction of the steering column support structure.

The above and other objects and features of the present invention will become apparent from the following descriptions of a preferred embodiment taking reference to the accompanying drawings.

DESCRIPTION OF THE PREFERRED EMBODIMENT

Figure 1:
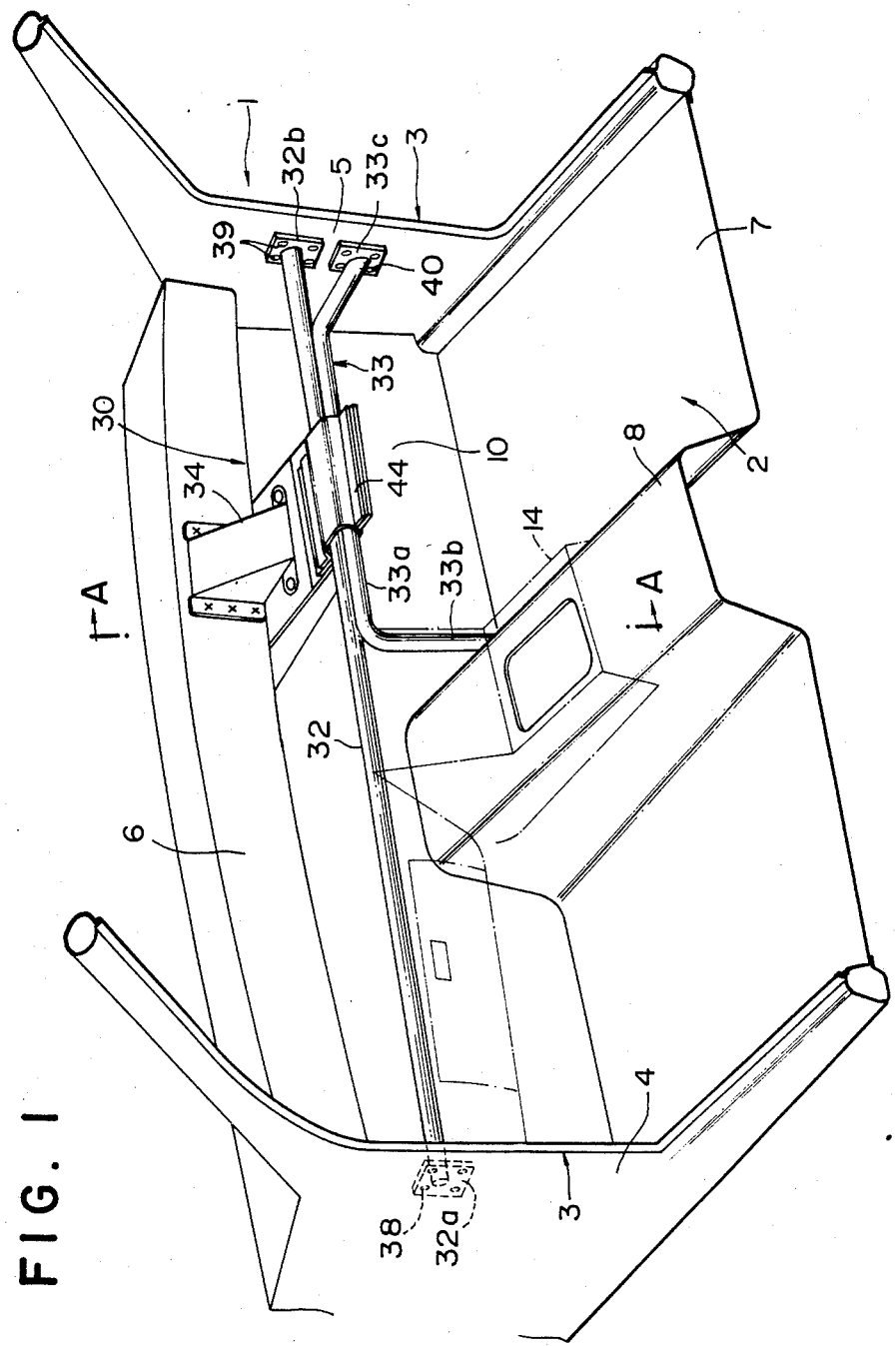
FIG. 1 is a perspective view of a steering column support structure in accordance with one embodiment of the present invention.
Figure 2:
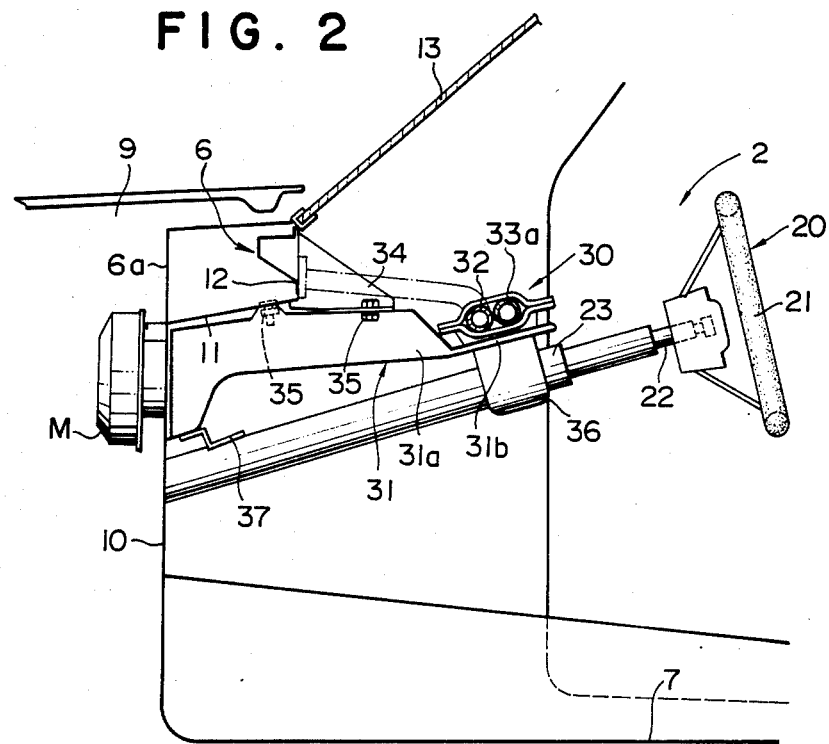
FIG. 2 is a longituding sectional view of the support structure taken along the line A—A in FIG. 1.
Figure 3:
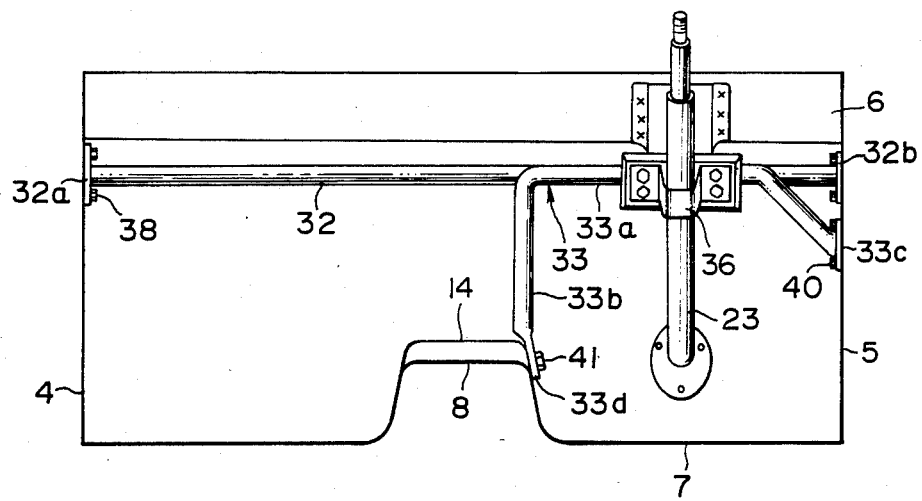
FIG. 3 is a rear view of the support structure.

Referring to the drawings, particularly to FIGS. 1 through 3, there is shown a vehicle front body 1 formed with a driver's compartment 2. The body 1 further has a door opening defined at each side partially by a door hinge pillar 3. Cowl side panels 4 and 5 are provided to extend forward from the hinge pillars 3 and a cowl inner panel 6 extends transversely between the cowl side panels 4 and 5 and welded at the opposite ends to these cowl side panels. The body 1 further has a floor panel 7 which is formed with a tunnel section 8 of an inverted channel shaped cross-section. In front of the driver's compartment 2, there is an engine compartment 9 defined by a dash panel 10 extending downward from the cowl inner panel 6 to the floor panel 7.

Referring to FIG. 2, it will be noted that the cowl inner panel 6 has a lower wall 11 which is substantially parallel with the floor panel 7 and a transverse wall 12 which is substantially perpendicular to the lower wall 11. The lower wall 11 of the cowl inner panel 6 is secured to the upper end of the dash panel 10. The cowl inner panel 6 is welded to a cowl upper panel 6a to form a structure of closed cross-section which supports a front windshield glass 13.

In the driver's compartment 2, there is a steering mechanism 20 supported by a steering support structure 30. The steering mechanism 20 includes a steering wheel 21, a steering shaft 22 secured at one end to the steering wheel 21 and a hollow steering column 23 encircling the steering shaft 22. The steering support structure 30 includes a master cylinder bracket 31, a first support member 32 and a second support member 33. The master cylinder 31 has a body portion 31a which is secured by means of bolts 35 to the lower wall 11 of the cowl inner panel and to a bracket 34 carried by the transverse wall 12 of the cowl inner panel 6. The bracket 31 carries a brake master cylinder M and the body 31a of the bracket 31 is formed with a rearwardly extending support arm 31b which carries a fitting 36 for attaching the steering column 23 to the bracket 31. A bracket 37 is further provided to connect the steering column 23 to the bracket 31 in the vicinity of the dash panel 10.

Figure 4:
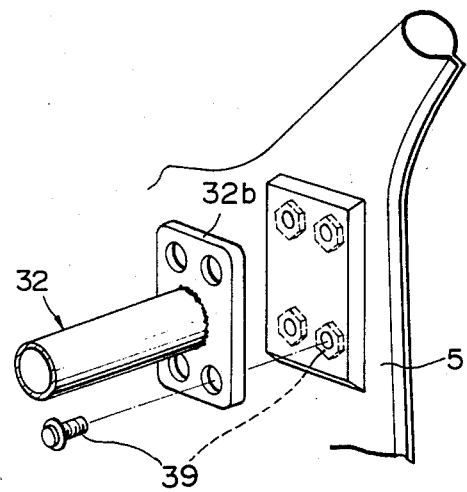
FIG. 4 is a fragmentary perspective view showing the installation of the first support pipe to the cowl side panel.
Figure 7:
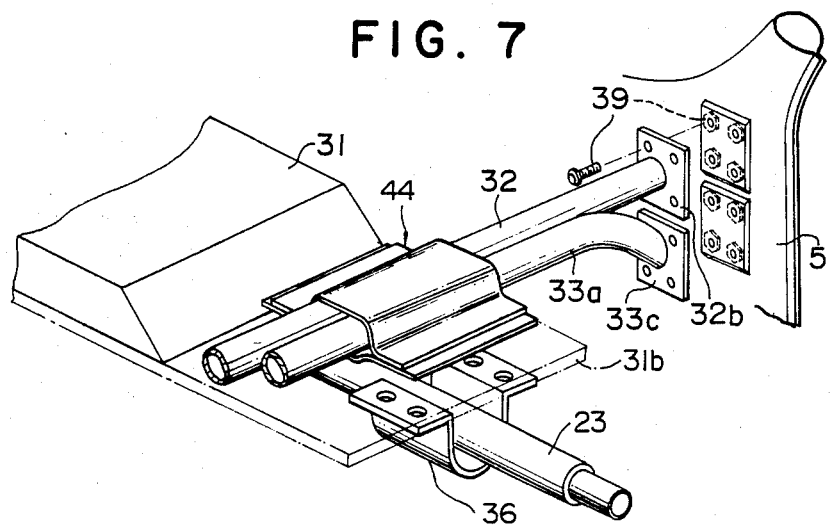
FIG. 7 is a perspective view showing the section shown in FIG. 6.

The first support member 32 is in the form of an elongated steel pipe which extends in parallel with but spaced from the cowl inner panel 6. The member 32 is formed at the opposite ends with attachment flanges 32a and 32b as shown in FIG. 3. In FIGS. 4 and 7, it will be noted that the flange 32b is secured to the cowl side panel 5 by means of bolts 39. Similarly, the flange 32a is secured to the cowl side panel 4 by means of bolts 38.

Figure 5:
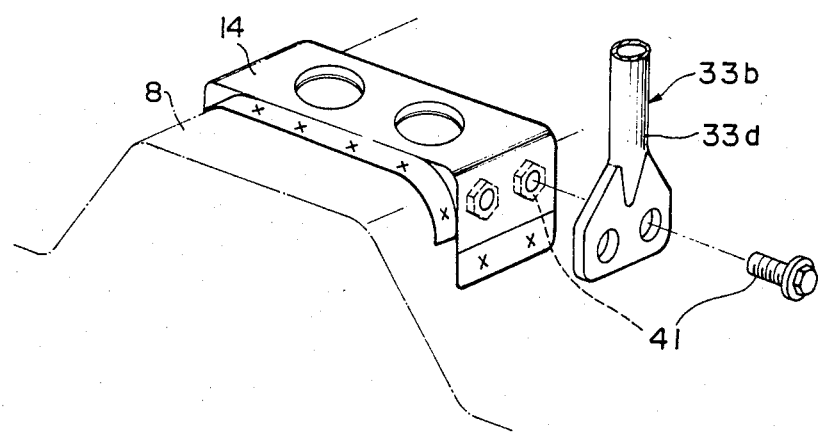
FIG. 5 is a fragmentary perspective view showing the installation of the second support pipe structure to the floor panel.
Figure 8:
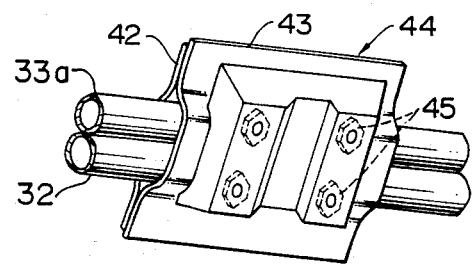
FIG. 8 shows the bottom of the column support bracket.
Figure 6:
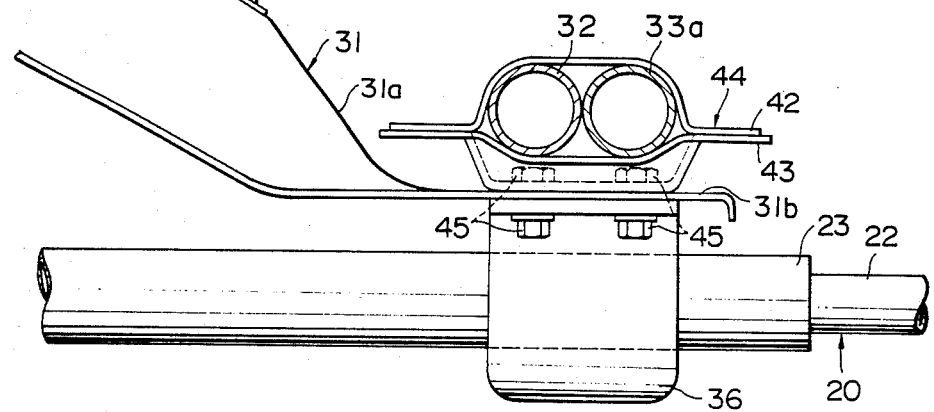
FIG. 6 is a sectional view specifically showing the column support section.

The second support member 33 is made of a steel pipe which is bent into a substantially L-shaped configuration. The member 33 has a first portion 33a which is bent obliquely at one end portion and formed at the extreme end with an attachment flange 33c. The flange 33c is connected with the cowl side panel 5 by means of bolts 40. The other end of the first portion 33a is continuous with a second portion 33b which extends substantially vertically downward. The second portion 33b is formed at the lower end with an attachment flange 33d which is secured to the tunnel section 8 by means of bolts 41 as shown in FIGS. 3 and 5. The first portion 33a of the second support member 33 extends along the first support member 32 and connected thereto by being held between a pair of plates 42 and 43 which together constitute a bracket assembly 44 as shown in FIGS. 6 through 8. The bracket assembly 44 is connected to the support arm 31b of the master cylinder bracket 31 at the side opposite to the fitting 36. The bracket assembly 44, the support arm 31b and the fitting are connected together by bolts 45. In this manner, the steering column 23 is supported by the master cylinder bracket 31 and the support members 32 and 33 with a satisfactory rigidity in either of the vertical and transverse directions.

The invention has thus been shown and described with reference to a specific embodiment, however, it should be noted that the invention is in no way limited to the details of the illustrated structures but changes and modifications may be made without departing from the scope of the appended claims.

I claim:

1. A vehicle steering column support structure including cowl side panels extending at the opposite sides of a vehicle body forwardly from door hinge pillars, a cowl inner panel extending transversely and having opposite ends secured to the cowl side panels, respectively, a first elongated support member extending transversely along said cowl inner panel and having opposite ends secured to the cowl side panels, respectively, a second support member having a first portion connected at one end with one of the cowl side panels and extending along said cowl inner panel and a second portion continuous with and extending downward from the other end of the first portion and having a lower end secured to a floor panel of the vehicle body, said first portion of the second support member being located at the same height as the first support member and extending in a side by side relationship with respect to the first support member, said first and second support members being in the form of hollow rod, bracket means connecting said first support member and said first portion of the second support member with a steering column assembly for supporting said steering column assembly by said first support member and the first portion of the second support member, said bracket means including a first bracket member connecting together said first support member and said first portion of the second support member, and a second bracket member connecting the steering column with said first bracket member.

2. A vehicle steering column support structure in accordance with claim 1, wherein said first and second support members are in the form of hollow rod.

3. A vehicle steering column support structure in accordance with claim 1, wherein said first and second support members are made of steel pipes.

4. A vehicle steering column support structure in accordance with claim 1 wherein second bracket means for connecting at least one of said first bracket member and second bracket member with said cowl inner panel.

5. A vehicle steering column support structure in accordance with claim 4, wherein said first bracket member connects together said first support member and said first portion of said second support member, and said second bracket member connects said steering column with said first bracket member, said second bracket means having a portion held between said first and second bracket members.

6. A vehicle steering column support structure in accordance with claim 4, wherein said vehicle body includes a dash panel extending downward from said cowl inner panel, said second bracket means being connected with said dash panel to thereby support said steering column on said dash panel.

7. A vehicle steering column support structure in accordance with claim 4, wherein said second bracket means is a brake master cylinder bracket for carrying a brake master cylinder.

8. A vehicle steering column support structure including cowl side panels extending at the opposite sides of a vehicle body forwardly from door hinge pillars, a cowl inner panel extending transversely and having opposite ends secured to the cowl side panels, respectively, a first elongated support member extending transversely along said cowl inner panel and having opposite ends secured to the cowl side panels, respectively, a second support member provided independently from the first support member and having a first portion connected at one end with one of the cowl side panels and extending along said cowl inner panel and a second portion continuous with and extending downward from the other end of the first portion and having a lower end secured to a floor panel of the vehicle body, said first portion of the second support member being located at the same height as the first support member and extending in a side by side relationship with respect to the first support member, first bracket means connecting said first support member and said first portion of the second support member with a steering column assembly for supporting said steering column assembly by said first support member and the first portion of the second support member, said first bracket means including a first bracket member connecting together said first support member and said first portion of the second support member, and a second bracket member connecting the steering column with said first bracket member, second bracket means for connecting at least one of the first and second bracket members with said cowl inner panel.

9. A vehicle steering column support structure in accordance with claim 8, wherein said first and second support members are made of steel pipes.

10. A vehicle steering column support structure in accordance with claim 18, wherein said first bracket member connects together said first support member and said first portion of said second support member, and said second bracket member connects said steering column with said first bracket member, said second bracket means having a portion held between said first and second bracket members.

11. A vehicle steering column support structure in accordance with claim 18, wherein said vehicle body includes a dash panel extending downward from said cowl inner panel, said second bracket means being connected with said dash panel to thereby support said steering column on said dash panel.

12. A vehicle steering column support structure in accordance with claim 8, wherein said second bracket means is a brake master cylinder bracket for carrying a brake master cylinder.

* * * * *